United States Patent
Lau et al.

(10) Patent No.: US 10,645,209 B1
(45) Date of Patent: May 5, 2020

(54) SMART ADDRESS BOOK SERVICE

(71) Applicant: T-Mobile USA, Inc., Bellevue, WA (US)

(72) Inventors: Kevin Lau, Issaquah, WA (US); Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/194,796

(22) Filed: Nov. 19, 2018

(51) Int. Cl.
| | |
|---|---|
| *H04M 1/725* | (2006.01) |
| *H04M 1/57* | (2006.01) |
| *H04W 4/024* | (2018.01) |
| *H04W 4/20* | (2018.01) |
| *H04M 1/2757* | (2020.01) |
| *H04M 1/27453* | (2020.01) |

(52) U.S. Cl.
CPC ..... *H04M 1/72519* (2013.01); *H04M 1/2757* (2020.01); *H04M 1/27453* (2020.01); *H04M 1/575* (2013.01); *H04W 4/024* (2018.02); *H04W 4/20* (2013.01); *H04M 2242/15* (2013.01); *H04M 2242/28* (2013.01); *H04M 2250/60* (2013.01)

(58) Field of Classification Search
CPC .......... H04M 1/72519; H04M 3/42042; G06F 3/0237
See application file for complete search history.

(56) References Cited

U.S. PATENT DOCUMENTS

| | | | | |
|---|---|---|---|---|
| 9,203,954 B1* | 12/2015 | Van Rensburg | .. | H04M 3/42042 |
| 2007/0061301 A1* | 3/2007 | Ramer | ................ | G06Q 30/0247 |
| 2010/0216442 A1* | 8/2010 | Kim | .................... | H04M 1/2745 455/415 |
| 2013/0244632 A1* | 9/2013 | Spence | ................... | H04M 3/51 455/415 |
| 2015/0172451 A1* | 6/2015 | Mousseau | ........... | H04M 7/0036 455/418 |
| 2017/0255278 A1* | 9/2017 | Aley | ..................... | G06F 17/276 |
| 2018/0032526 A1* | 2/2018 | Cudak | ................... | H04L 63/123 |

\* cited by examiner

*Primary Examiner* — Joshua L Schwartz
(74) *Attorney, Agent, or Firm* — Han Santos, PLLC

(57) ABSTRACT

A smart address book service configured to provide contextual information from a user's address book or contacts database so that when a user enters information into a device such as a smart phone, the service can correlate information from the contacts database with the user's entered information, look at additional context of what the user is doing/has done, and provide action options for the user to select. Thus, the service can discern what the user is likely trying to achieve based on contextual information provided by or through the smart phone, and pull corresponding data from the user's contacts database (on the user's equipment, e.g., smart phone, and/or from an address book associated with the user and stored on servers of the user's telecommunications service provider) as well as from the Internet to provide information necessary for the user to achieve the objective.

20 Claims, 3 Drawing Sheets

SMART ADDRESS BOOK SERVICE

BACKGROUND

In today's connected world of electronic communications, a person's communication device such as a smart phone, tablet, laptop computer or other personal user equipment with computing power and electronic communications capability often includes address books or databases of information regarding contacts of the person. This information can informally represent the person's social and business networks and can encompass a significant portion of contacts or interfaces that the person has with the world around them.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

This disclosure is directed to implementing a smart address book service configured to provide contextual information from a user's address book or contacts database so that when a user enters information into a device such as a smart phone, the service can correlate information from the contacts database with the user's entered information, look at additional context of what the user is doing/has done, and provide action options for the user to select. Thus, the service can discern what the user is likely trying to achieve based on contextual information provided by or through the smart phone, and pull corresponding data from the user's contacts database (on the user's equipment, e.g., smart phone, and/or from an address book associated with the user and stored on servers of the user's telecommunications service provider) as well as from the Internet to provide information necessary for the user to achieve the objective.

The smart address book service in exemplary embodiments is anchored or tied to a person or user, and considers context of the user along with context of entities referenced in the user's address book or contacts database to pull information from different data sets, and match the information in view of context of what the user is doing or has done. Then the smart address book service can automatically select an option to present to the user to act upon, or can automatically select and rank different options and present them to the user to select among.

The smart address book service can extend across multiple devices used by the user and can also extend across different software applications that share information. In some embodiments the service is anchored to or centered around a particular account which can span multiple devices and also multiple users that are grouped together, for example for billing purposes and/or for other reasons such as common objectives, responsibilities, tasks, projects, or interests. In some embodiments the smart address book service can check outside sources such as entity web pages on the Internet to verify or correct and update phone numbers or other contact information in the user's address book, and can alert the user when updates are available so the user can check or confirm and accept the revised contact information into the user's address book or contacts database.

Figure 1:
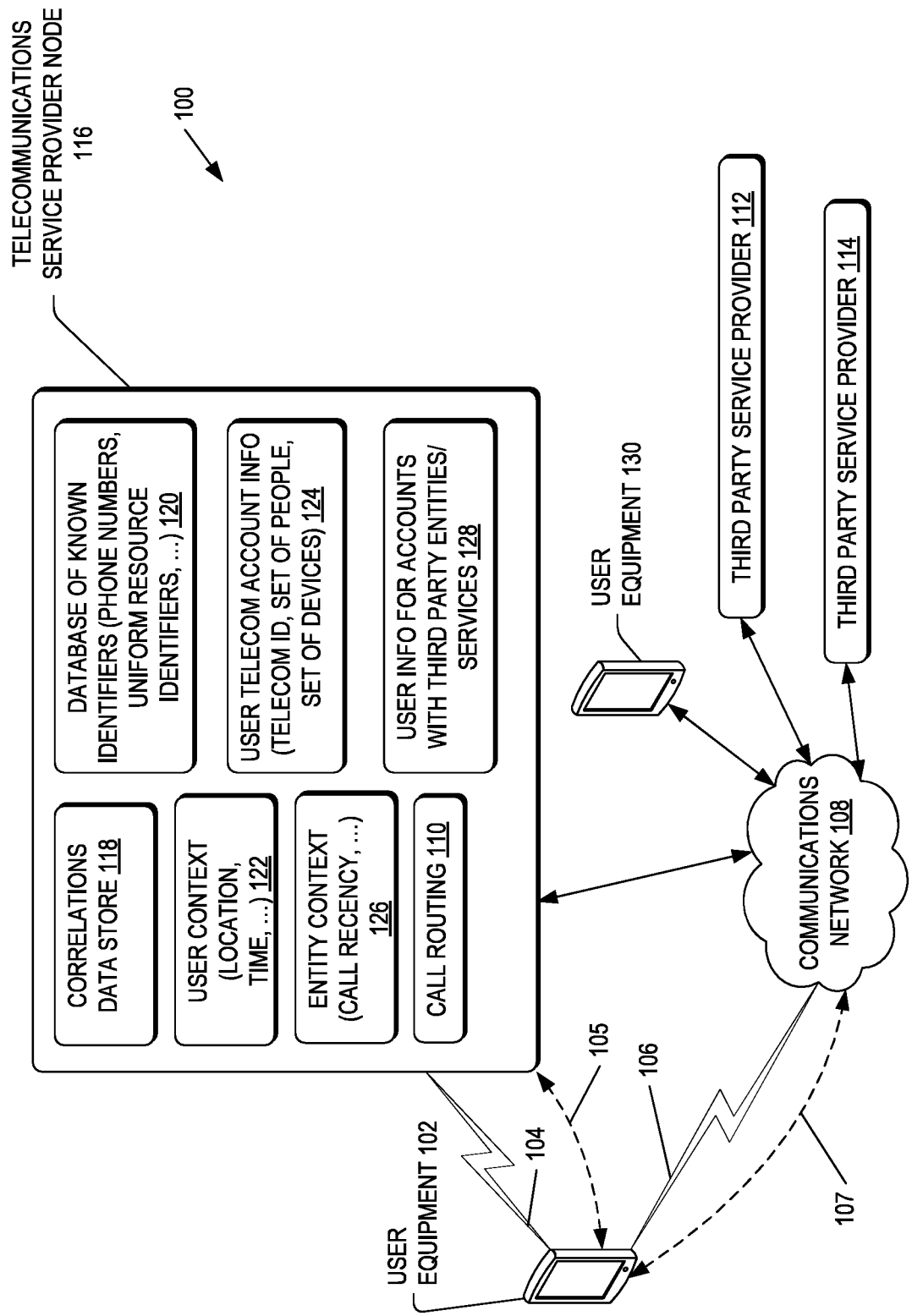
FIG. 1 shows an illustrative computing environment and network architecture for implementing techniques to access a user's personal information including an address book and other contextual information, and present communication choices to the user to enable the user to more efficiently or effectively accomplish tasks.

FIG. 1 shows an illustrative computing environment and network architecture embodied in a system 100 for implementing techniques to access a user's personal information including an address book and then, based on that personal information and additional contextual information and input from the user, present communication choices to the user to enable the user to more efficiently or effectively accomplish tasks.

As shown in FIG. 1 a user equipment 102, which can be a smart phone, tablet, laptop computer, desktop computer or any other device that the user can use for electronic communications, can connect to both a telecommunications service provider node 116 and a communications network 108. The telecommunications service provider node 116 includes information and computational resources that support use and function of the smart address book service, and can also carry communications between the user equipment 102 and other entities such as other users or organizations such as businesses, government entities and so forth, represented for example by the user equipment 130 and the third party service providers 112, 114 shown in FIG. 1. In some embodiments the user equipment 102 can rely on the telecommunications node to provide support for smart address book services while the user equipment 102 communicates directly with other entities, as enabled by the communication triangle or reciprocal communication pathways between each of the user equipment 102, the telecommunications service provider node 116, and the communications network 108 as shown in FIG. 1.

Some or all of the resources provided by the telecommunications service provider node 116 can be present on the user equipment 102, and data resources can be downloaded from the telecommunications service provider node 116 to the user equipment 102 on an as-needed basis. In addition, revisions or updates to the user's address book or contacts database can be synchronized between copies locally present on the user equipment 102 and copies present on the telecommunications service provider node 116.

The telecommunications service provider node 116 can be a single location or resource within a telecommunications network of a telecommunications service provider with whom the user has a contract for communication services (e.g., wireless phone and data communications) provided to or through the user equipment 102. Alternatively, the telecommunications service provider node 116 can be a virtual node with components and functions that are variously distributed within the service provider's telecommunications network, with advantages of computational scaling, data redundancy and network flexibility that such distribution of resources can provide.

In example embodiments, resources provided by or through the telecommunications service provider node 116 include a contacts database 120 of known identifiers for contacts of the user, which forms an address book or contacts database for the user. The contacts database 120 can include, for example, telephone numbers, email addresses, Uniform Resource Identifiers (URIs), physical location addresses, user's notes, and so forth. The contacts database 120 can also include calendars that the user owns or has access to. This database can be primarily located on the user equipment 102 and backed up to the telecommunications service provider node 116, can be primarily based in the telecommunications service provider node 116 and partially resident on the user equipment 102, or can be allocated in different ways in terms of content and primacy or priority between the two.

The telecommunications service provider node 116 also includes a module 124 that contains information about the user's telecommunications account, for example a number of supported devices, monthly rates and limits for voice calls, data, various additional services (call waiting, call forwarding, and so forth) and where a single account serves a group of people such as a family, similar or additional information for each person in the group, including for example different access permissions, limits, feature sets and so forth.

The module 128 within the telecommunications service provider node 116 contains information that the user is willing to share or store with the telecommunications service provider regarding accounts or memberships that the user has with other business organizations or entities. This information can include, for example, user identification and password information so that the telecommunications service provider or agents thereof can automatically log in to the accounts on the user's behalf to retrieve or share information and provide efficient access to the services and information provided by those other organizations or entities which the user is a member of or has a relationship with. This access to third party services in the name of the user can further enable the telecommunications service provider to provide personal digital assistant services to the user, for example via the smart address book service.

The user context module 122 in the telecommunications service provider node 116 tracks and stores contextual information regarding the user. This contextual information regarding the user can include, for example (and with the user's permission), history regarding where the user equipment 102 has been, what applications the user used at different times and locations, movement history and patterns of the user (via the user equipment 102), entries in the user's calendar, text and email content received and sent by the user, weather, local news or other events, and so forth. **[Kevin, Senthil—Is there additional contextual information we can or should mention here?] Where the user has multiple devices or instances of user equipment, contextual data for some or all of them can collected, recorded and aggregated and integrated, for example to provide a more complete picture of the user's contextual data.

The entity context module 126 in the telecommunications service provider node 116 can be used to collect information regarding entity context, or in other words, information about different entities, and also information regarding the user's interaction with the different entities. This can include for example details of interactions the user has had with different entities over time, in particular call frequency and recency of calls to a particular entity or individual. Information in the entity context module 126 can also include information to identify calls the user has made as being directed to different departments or people within a same entity, which can provide nuanced qualitative information as to the purpose of the different calls and of the user's relationship with the entity. In addition, where an entity has a dedicated application on the user equipment 102 (e.g., a Facebook software application on the user's smart phone) the entity context module 126 can collect information regarding usage of the dedicated application that can be correlated with other contacts the user has made with that entity by phone call or website visit.

The correlations data store 118 in the telecommunications service provider node 116 includes an analysis engine to correlate and integrate data collected by the various modules 120, 122, 124, 126, 128 and generate inferences or likelihoods that different usage patterns suggest particular habits of the user or particular tasks, objectives, or processes that the user elects (or elected) to accomplish or set in motion. Results generated by the correlations data store can be anonymized and shared within the telecommunication system provider's business intelligence knowledge base or expert systems so that learnings from specific users or clients of the telecommunications system provider can be used to benefit others of the provider's clients.

Functions of the different modules 118, 120, 122, 124, 126, 128 can be variously combined or reorganized in different modules. For example, in an example embodiment a single module includes functions and data of the user context module 122, the entity context module 126, and the third party account information module 128. In another embodiment, the entity context module 126 contains both information about entities that is not specific to the user, as well as information describing the user's relationships with the entities, including information about accounts the user has with the entities. In another embodiment, the entity context module 126 contains information about entities that is not specific to the user, and the user context module 122 contains information describing the user's relationships with the entities, including information about accounts that the user has with the entities.

User-configurable privacy and security safeguards can be provided for personal information regarding the user that is held by or accessible to the telecommunications service provider, for example in the telecommunications service provider node and also on the user equipment 102. Personal user information can include but is not limited to the user's contacts database or address book, account information, and contextual information regarding use and status of the user equipment 102 (location, movement history, communications history and so forth). Privacy and security safeguards can be provided to apprise the user when the user's third party accounts are accessed by the telecommunications service provider and for what purposes, and also to apprise the user when third party entities access or request access to user information held by the telecommunications service provider. These privacy and security safeguards can be user-configurable so that the user can set and revise them as needed or desired.

Returning to a functional description of the system 100, the user equipment 102 can communicate with the node 116 and the communications network 108 via wireless links 104, 106 or additionally or alternatively via wired links (electronic cable, fiber optics, and so forth) 105, 107.

The communications network 108 shown in FIG. 1 generally represents telecommunications infrastructure and can include the Internet and other networks that in turn communicate with the Internet, and can include other telecommunication service providers and pathways that different telecommunication service providers use to communicate with each other and provide end-to-end communications between the user equipment 102 and other entities such as personal devices of other users as well as individuals or automated services within corporate entities or other organizations, for example third party service providers 112, 114 shown in FIG. 1. By way of general example, the communications network 108 can represent communications infrastructure that connects the user equipment 102 with the providers 112, 114, including for example a home wireless network (WiFi system) connected via cable or digital subscriber line (DSL) Internet service to the Internet, and so forth.

The third party service providers 112, 114 can for example represent social network service providers such as Facebook, service providers that rely on telecommunications services to deliver or arrange services such as transportation network companies (Lyft, Uber), cloud-based document and/or computational service providers (email, cloud storage, data analysis services offered by Amazon, Google, Microsoft, and so forth) and other kinds of service providers. The user equipment 130 represents a device of another user with whom the user of the user equipment 102 can share a voice call, text chat, email exchange, and so forth, for example a family member, friend, work colleague or other individual.

Several example scenarios will illustrate various capabilities of embodiments disclosed herein.

In a first scenario, a child in the user's family has a long-term medical condition and the user has exchanged several phone calls with a local children's hospital that has been providing specialized medical care for the child. In addition, the user and the child have visited the hospital on several occasions for diagnosis and treatment, and those visits were scheduled in the user's calendar on the user's mobile phone (and shared with others of the user's devices, such as tablet, laptop, and desktop computers). Another visit relating to the child's medical condition was in the nature of an urgent care visit to a clinic affiliated with the hospital and not scheduled in advance, and the user entered the name and contact information of the attending physician at the clinic in the address book along with a dated comment as to the nature of the visit and a next step to follow up with the children's hospital. If an incoming phone call to the user from the children's hospital or an affiliated care provider is initially labeled as in use by a telemarketer or as "spam" (e.g., is known to have been misused for unwanted or fraudulent calls), the smart address book service can check the user's call history to see that the user did have a past conversation with a caller using that number that lasted longer than a threshold amount of time (e.g., longer than two minutes), within a recent time window (e.g., within the past 6 months) and can conclude that the presently incoming call is likely legitimate. The smart address book service can also check and see that the number is listed as a contact for the children's hospital in the user's address book, and further can perform an automatic Internet search and see that the hospital's website includes the phone number of the incoming call as a contact number. Thus, the smart address book service can apply the user's call history, pattern of call behavior, address book/contacts database and a website of the children's hospital to determine that the incoming call is likely a legitimate call from the children's hospital and recommend that the user take the call as well as indicate whom the call is from and what it likely may concern. The smart address book service can also indicate the user's past visits together with descriptions, dates, times and notes, including the urgent care clinic visit, so that the user can review and reference that information while on the call, for example when using a hands-free or speakerphone option. The smart address book service can also provide an option that the user can select, which when selected will automatically summarize the past visit information and send it to a destination such as an email address or text message address pulled from the user's contacts database, located by Internet search on the calling entity, or entered directly by the user.

In a second scenario, the user has a membership account with a company such as Lowe's Home Improvement, and has enabled the smart address book service to automatically access the account, for example by visiting a website operated by the company and navigating a login dialogue to authenticate the user (or an agent of the user such as the smart address book service) to the company and access account information and interact with the company on behalf of the user. When the user receives a call from Lowe's, the smart address book service checks to see whether the calling number is listed in the user's contacts database and/or call history, optionally cross-checks the calling number against Lowe's website (e.g., to confirm that the call is coming from Lowe's, and if possible which department is calling), and accesses the user's membership account with Lowe's (or consults a cached status of the Lowe's membership account that is periodically updated by a "push" from Lowe's or an inquiry from the smart address book service). With this information the smart address book service confirms the call origin and may determine the likely nature of the call—for example, status of an equipment order that the user placed with Lowe's, or a billing inquiry—and alerts the user to the origin and possible or likely subject of the call.

In another variation of the second scenario, the user can designate Lowe's by entering an input such as "lowes" via text or speech into the user's communication device (e.g., user equipment 102 such as smart phone, etc., in an Internet browser search field, in a search field of the user's address book, or in connection with other applications or the user equipment 102's operating system software). The smart address book service can search on the entered term, for example performing an Internet search as well as a search of the user's contact database, and discern that the user likely is referring to Lowe's Home Improvement and provide a confirmation dialogue to the user optionally including other possibilities that may also be a match. The smart address book service can automatically access the user's account with Lowe's (optionally after receiving confirmation from the user designating Lowe's as the user's intended entity), identify issues relating to the account such as outstanding orders or billing status, summarize them to the user, and provide the user with communication options to open communications with Lowe's regarding one or more of the identified issues (e.g., option to contact Lowe's consumer finance or billing department, a specific or general department regarding an outstanding order, and so forth). Communication can then be opened, for example initiating a phone call, in response to a selection from the user.

In a third scenario, the user has a membership with a service company, for example a transportation network company such as Lyft, which organizes ride sharing or taxi services and relies heavily on digital telecommunications. In the third scenario there are basically two initial possibilities, a) no service order is pending but the user appears likely to need or request services; or b) the user has requested services and wants to check a status of the request, request or schedule status updates/alerts, change terms of the request, open direct communication with an assigned local service provide (e.g., an assigned Lyft driver), and so forth. In both circumstances, the smart address book service can use contextual information to infer what the user may likely want to do and then provide user-selectable options to help the user proceed efficiently.

When the user enters "lyft" into the user's communication device (e.g., user equipment 102 such as a smart phone, etc., in an Internet browser search field, in a search field of the user's address book, or in connection with other applications or the user equipment 102's operating system software) the smart address book service determines the user's intent as having to do with Lyft, optionally provides a confirmation prompt to the user that the user can select to confirm that the user wants to take an action related to Lyft, and checks the user's context with respect to Lyft. Alternatively, the user can enter the name of another taxi service, or simply a description of what is desired such as "taxi service", and the smart address book service can provide actionable links to the other taxi service or a list of taxi services (including Lyft) for the user to select or choose from. Actionable links can include a selectable dialogue button to call or text the corresponding taxi service or contact a website of the taxi service.

The user's context can include, for example, a current time of day and the user's geographic location as presently provided by the user's communication device location (or as explicitly provided by the user, for example "lyft, Bellevue building B, 5 pm", which can for example be input in a web browser information field, in a web page data field, in a text message to Lyft, in a dedicated Lyft application or transportation application or in a search or data field of the user's smart phone operating system). Contextual information can also include history involving the user and Lyft, such as the user having historically requested a taxi ride on prior occasions near that time (day of the week, hour of the day) and/or location. Contextual history can also include recent communication log entries that relate to Lyft, for example a) recent use of a dedicated Lyft application and summary information provided by that application via an API (application program interface) to the communication device's operating system or other application(s) on the communication device, and/or b) a recent call or text message involving a phone number affiliated with or belonging to Lyft, or communication with Lyft via an Internet website.

In the third scenario, contextual information can also include information received directly from Lyft, by the smart address book service applying the user's Lyft account information to log in to the user's Lyft account or otherwise verify authenticity to Lyft and request Lyft account information for the user from Lyft. For example, Lyft account information for the user can include when the user last requested Lyft services, whether there is an outstanding taxi services request that is still pending or has otherwise not yet been fulfilled or resolved, and/or details regarding the request and fulfillment status for it (car has been assigned, is on its way, has arrived and is ready, is waiting for a response or further input from the user, has a particular color, make, model, and/or partial plate number, is behaving or will behave in a certain way to signal availability such as flashers or parking lights activated, direct contact information for the assigned Lyft driver such as phone/text address, etc.). Then, some or all of the status information can be appropriately reflected back to the user, with applicable action options for the user to select from—for example, to request a pickup at a location and time, confirm or revise a pickup location or time, confirm receipt of identifying information such as car make, model, color, (partial) plate number, etc., request one or more alerts for the user when the request status changes or hits completion markers or transitions (e.g., is on track for an on-time arrival, will become late, is 5 minutes away from the pickup location, is at the pickup location, has been at the pickup location for "X" minutes, the Lyft driver has turned on a light signal, and so forth), or open a phone call or text message communication with the assigned Lyft driver. To this end the smart address book service can display status information such as current location and estimated progress of the Lyft vehicle, can display identifying information for the Lyft vehicle, contact information for the Lyft driver with dialogue buttons to immediately open communication by phone, text, or other method, and so forth.

In a fourth scenario, a user selects among several geographically-based service locations. For example, if a user enters "starbucks" into an interface of her communication device, the smart address book service can check contextual information, discern that the user is interested in Starbucks beverages and snacks, and provide selectable options to the user regarding specific Starbucks locations. If the user had communicated electronically with a Starbucks store to place an order, the smart address book service can determine existence of the order, check on the order status through further electronic communication with Starbucks, and provide a status update and possibly also further options to the user (e.g., to revise or cancel an unfilled order, add to an order, request that the order be set aside or prepared for pickup, schedule the order for delivery through a transportation network company, and so forth).

If no order is outstanding, the smart address book service can analyze available contextual information and recommend one or more Starbucks locations to the user and provide selectable options regarding them, for example to place an order remotely (or even pull up an habitual or standard order), navigate the user to one of the Starbucks locations, and/or prepare and then send a message to other people (for example a customary group) to invite them to join the user at a particular Starbucks location, walk with the user, or request the user to pick up an item for them. Information regarding the group and regarding contact information for people in the group can be located in the user's address book or contacts database, accessible to the smart address book service.

In particular in the fourth scenario, the smart address book service can respond to the user's input of "starbucks" or similar text or speech inquiry by checking the user's contacts database/address book to see if the user has any listings for Starbucks, performing an Internet search to look for Starbucks locations near or nearest to the communication device (or in the vicinity of a location explicitly designated by the user), and checking the user's geographic location history to see which Starbucks locations the user has visited most frequently and most recently, and which are the user's favorites and under what conditions. In addition, in circumstances where the user has in the past paid for purchases at Starbucks via online payment systems that involve the user's communication device (e.g., Apple Pay on Apple iPhones) and the user has enabled the smart address book service to access the user's accounts with those systems or otherwise enabled data sharing, the smart address book service can look at payment history to discern which Starbucks locations are the user's favorites. If the payment information doesn't include location information but does include time and date information, then the smart address book service can correlate or integrate the time and date payment information with geographic location history information of the user's communication device (or of a set of communication devices associated with the user) to discern which Starbucks the user visited and when. The payment amounts and/or type and amount of products purchased (where available) can also be contextual information of the user that the smart address book service can access and use to select and provide useful options to the user. If the user has an account with Starbucks, that account information can be accessed and used, for example in similar fashion to that described in the second and third scenarios.

In the fourth scenario contexts other than distance can indicate different preferences of the user. For example, it may be that the user prefers a first Starbucks location when meeting with other people, a second Starbucks location when ordering remotely, and yet a third Starbucks location when the user visits alone. Analysis of the user's calendar and historical Starbucks purchasing patterns can suggest that on particular days and times the user prefers one Starbucks location over another (a longer, more pleasant walk after a recurring long meeting, or a Starbucks that is more distant from the user's habitual workplace but is along a habitual commute path of the user). Thus contextual information that can suggest different Starbucks locations and particular options for visiting or communicating with those Starbucks locations and optionally other people, can include, but is not limited to, day of the week and time of day; temporal proximity to particular entries in the user's calendar; local vehicle traffic patterns and current traffic status; weather, sunny vs. rainy vs. cold, etc.; expected duration of visit (eat-in or take-out, adjacent or impending calendar commitments); and physical distance or expected travel time from the user's current location or future expected location to the Starbucks locations under consideration (e.g., within a given travel time or distance radius).

In a fifth scenario, the user is traveling and arrives at an airport with a very low battery level in the user's communication device. The smart address book service can use contextual information of the user's location being at an airport and distant from the user's home or habitual area and can infer that the user has not brought a battery charger for the communication device. In an example embodiment, the smart address book service can access flight information from the user's calendar or email applications to discern travel plans/itinerary and based on that information or additional information gleaned from automatically contacting the airline, can also optionally discern whether the particular aircraft that the user was on featured charging stations or facilities local to the user's seat. If yes, the smart address book service can more strongly infer that the user did not bring a battery charger or charging cable (if she had one she would have used it). Further to an inference that the user did not bring a battery charger but needs one (the user's communication device battery charge is low and based on a typical usage of the user won't last until the user is scheduled to return home), the smart address book service can recommend options to the user for securing charging equipment such as a battery charger or charging cable. For example, the smart address book service can automatically search for nearby store locations that sell device charging equipment, and/or search online vendors such as Amazon or Best Buy that stock compatible battery chargers and can deliver them to a designated location.

Then the smart address book service can recommend options to the user—for example to visit a store in the airport terminal that has a battery charger, visit a store between the airport and a hotel where the user has a reservation (as noted for example in the user's calendar or in a travel itinerary in an email sent or received by the user), or to place an order with an online vendor to have a battery charger delivered to the user's hotel or other location within a desired time frame. The smart address book service can cause the user's communication device (e.g., user equipment 102) to present options to navigate to or communicate with stores that have or might have compatible device charging equipment, and/or can bring up an online ordering web page so that the user can easily follow through to order equipment such as a battery charger for delivery to an address listed in or inferred from the user's travel itinerary. For example, the smart address book service can sign the user in to Amazon and provide additional information such as by pre-populating the user's hotel address into a delivery address field with a "care of" designation and with recommended delivery options selected that are compatible with the user's itinerary, so that the user can easily and quickly order a recommended or listed battery charger, or another copy of a charger that the vendor knows the user has purchased in the past.

Figure 2:
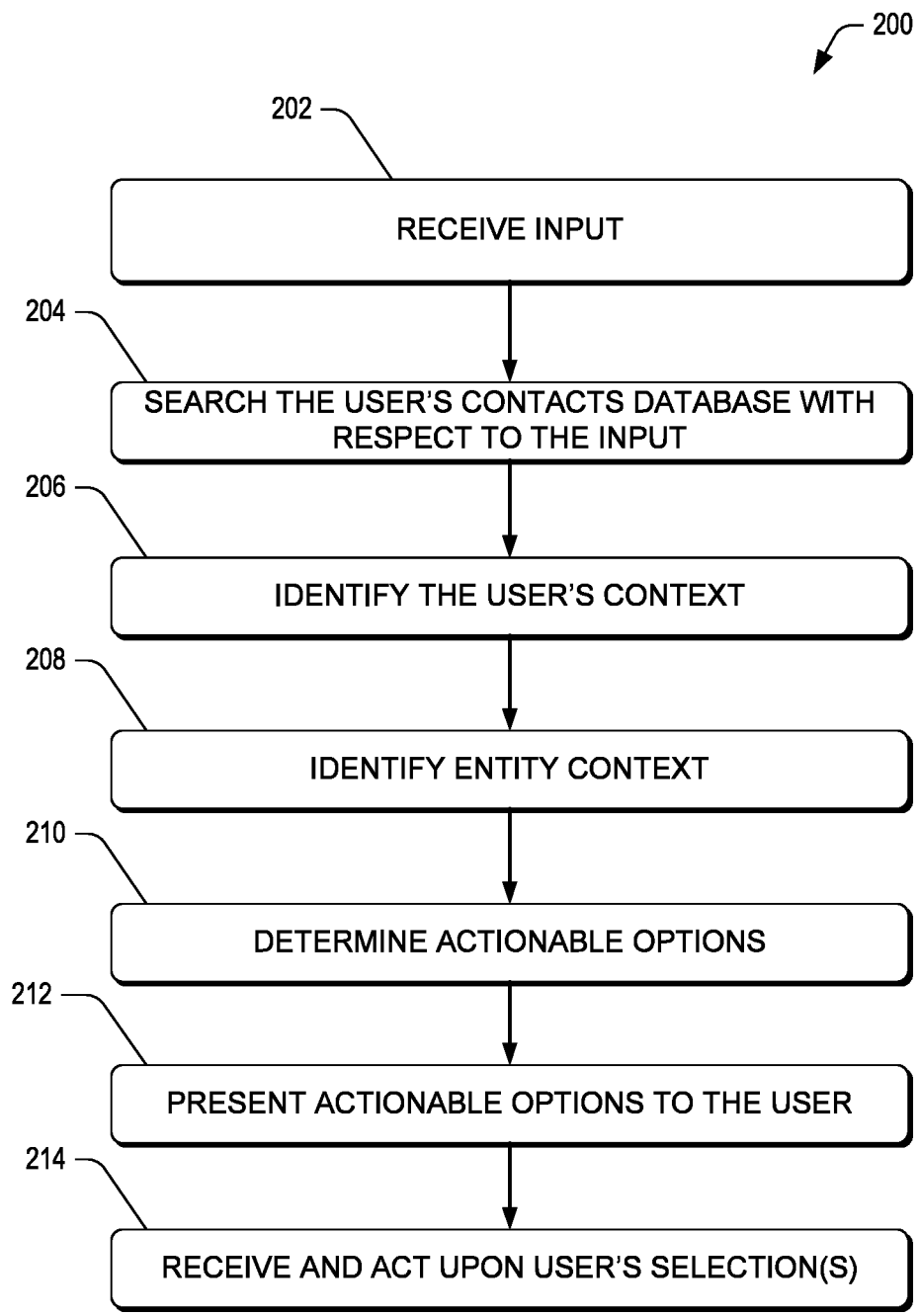
FIG. 2 is a flow diagram of an illustrative process for accessing a user's personal information including an address book and other contextual information and presenting communication choices to the user to enable the user to more efficiently or effectively accomplish tasks.

FIG. 2 illustrates a process that encompasses the smart address book service scenarios and embodiments variously described herein. In a first block 202, the service receives input. This input can be, for example, a phone call, text message, email, or other communication incoming to a user or user's communication device, that is initiated by a third party or an entity other than the user, or is initiated by the user's communication device, as for example in the fifth scenario noted above, where the user's communication device reports a low battery level. Another example would be, a phone call from a hospital or medical professional as in the first scenario. Alternatively the input can be input that the user provides to the communication device such as speech or alphanumeric input that describes or indicates an entity or service, such as "lowes" from the second scenario, "lyft" or "taxi" from the third scenario, "starbucks" or "coffee" or "snacks" from the fourth scenario, and/or a communication address such as a phone number, email address or the like.

From block 202 the process proceeds to block 204, where a search is performed based on the input from block 202 with respect to the user's contacts database or address book, which can also include temporal contact records such as information from one or more calendars of the user. Where entries in the user's contacts database match possible interpretations or indications of the input from block 202, those matches more strongly infer the user's likely intent and task objectives and confirm identification of an entity or service indicated by the input of block 202, and can be used to rank actionable options later presented to the user, for example with respect to different entities that match, and/or different actions the user can take with respect to the entity or entities. Results of the search can also provide specific information including contact and location information for entities listed in the user's contacts database, attributes or characteristics of the entities, notes entered by the user with respect to the entities that can further describe relationships between the user and the entities and projects or services, and so forth.

From block 204 the process proceeds to block 206 where the user's context is searched and correlated with respect to results of blocks 202, 204. As noted earlier this context information can include historic information regarding the user such as historic locations and activities of the user involving the user's communication device(s) as well as details of past interactions that the user has had with the entity or service indicated by the input of block 202. Details of past interactions can include, for example, details regarding past phone calls and hospital visits as noted with respect to the first scenario, and purchase and communication histories as noted with respect to the second (Lowes), third (Lyft) and fourth (Starbucks) scenarios. If the user has an account with the entity indicated by the input of block 202 that is accessible via electronic communications, in block 206 the account can be automatically accessed as noted for example with respect to the second (Lowes) and third (Lyft) scenarios to obtain additional or current information describing a relationship between the user and the entity and a status of engagement between them (outstanding service requests, etc.).

From block 206 the process proceeds to block 208 where context of one or more entities identified in prior blocks is accessed and correlated with results of prior blocks. In particular, in block 206 an Internet search can be performed to confirm contact information or other descriptive information regarding the entities, and some or all of the confirmed information can be automatically updated into the user's contacts database, optionally with appropriate flags to seek the user's approval for updates and/or indicate that information has been updated and old or obsolete information will be deleted or archived. As noted earlier with respect to FIG. 1, "entity context" can be construed to include information regarding a relationship between the user and an entity, or can be construed to include only information about the entity that is independent of the user (in which case, user context information can include information regarding a relationship between the user and an entity). Alternatively information regarding a relationship between the user and an entity can be included in both user context information and entity context information or variously distributed between them. In block 208, information about the entity that was indicated or identified in earlier blocks can be accessed, from records belonging to the user or from records held by third parties or the entity itself (e.g., via the Internet)—for example, in the fourth scenario, Starbucks locations, hours of operation, and contact information.

From block 208 the process proceeds to block 210, where results from prior blocks are considered and any further correlation, processing or analyzation is performed to determine information and one or more actionable options to present to the user for selection. This can be done using any of various appropriate methods or combinations thereof, including use of machine learning, expert systems and the like. For example with respect to the first and second scenarios, information can include caller identity and a likely subject of the call, as well as options to review background information regarding the caller or likely subject of the call, share background information with the caller or entity whom the caller represents, access an account the user has with the calling entity, and so forth. With respect to the third scenario, actionable options can include presenting to the user an option to verify contact information for an entity indicated by the user, present updated contact information for the entity indicated by the user along with selections to store the updated contact information into the user's contact database and/or initiate communication with the entity using the updated contact information, and so forth. With respect to the third scenario, actionable options can also include presenting pre-populated service request information (e.g., the smart address book service sees the user enter "lyft" or "taxi" and notes that the present time and location of the user suggest, based on historic patterns of the user, that the user wants to depart at a particular time from a particular location towards a particular destination) to the user for verification or revision. Actionable options can also include reminders along with opportunities to refine an existing service request (the ride service vehicle is en route, would you like to change or confirm the pickup location) or otherwise interact with the service provider. Actionable options can be rank-ordered based on historical preferences of the user and other contextual data regarding the user's present circumstances, and can be grouped so that if the user declines one option in a group or provides additional information, a different group of options can then be presented to the user.

From block 210 the process proceeds to block 212, where the actionable options determined in block 210 are presented to the user for review and selection or are provided for transmission to one or more of the user's communication devices for presentation to the user. From block 212 the process proceeds to block 214 where the users selections are received (at the user's communication device, or from the user's communication device) and acted upon, consistent with the system described with respect to FIG. 1 and the various embodiments and scenarios described herein.

All or some of the operations and functions variously described herein with respect to example embodiments and scenarios and the process shown in FIG. 2 can be variously re-ordered, performed in sequence or in parallel, and performed iteratively. For example, identification of user context and entity context can be performed in parallel or asynchronously, blocks 202-208 can be iteratively repeated as the user enters information, and where the user's selections in block 214 present additional information the process can start again at block 202.

Figure 3:
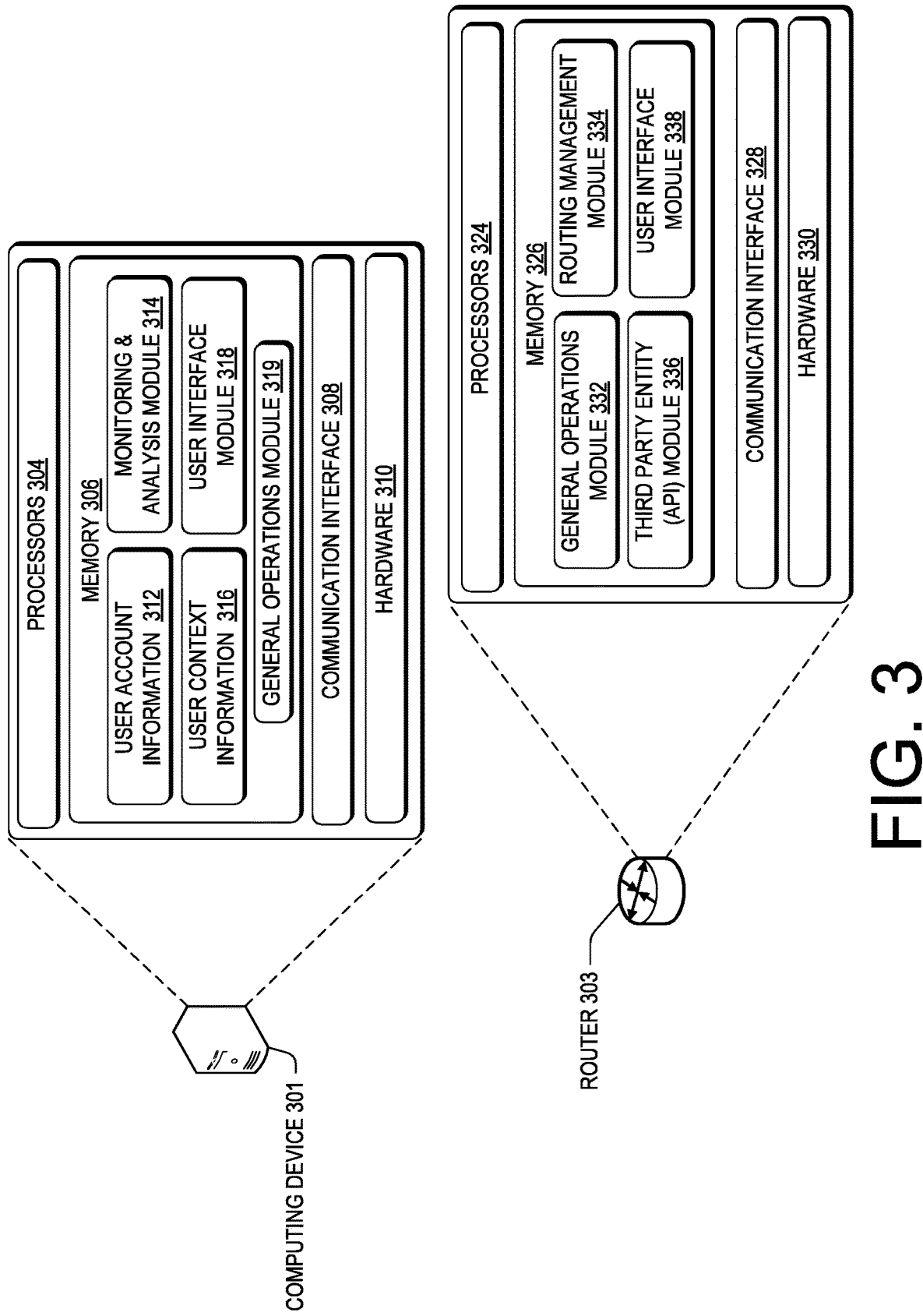
FIG. 3 shows illustrative details for various routers and servers/controllers to implement different aspects of the architecture shown in FIG. 1.

FIG. 3 shows illustrative details of a computing device 301 and a router 303 that can support, or be implemented as, the system components and functions shown in FIG. 1 and/or functions described herein with respect to various embodiments and scenarios.

One or more instances of the computing device 301 can for example form a basis for the user equipment 102 as well as for computing functions of the telecommunications service provider node 116 or for other functions within the system 100, such as the user equipment 130, communications network 108 and third party service providers 112, 114 as well as various functions described with respect to the process of FIG. 2. The computing device 301 includes processors 304, hardware 310, and a communication interface 308. The computing device 301 also has a memory 306 that includes (but is not limited to) the various software modules shown. A user context information module 316 can facilitate storage of and access to user context information gathered by or through the user equipment 102 as well as from other sources.

The computing device's memory 306 can also include a monitoring and analysis module 314 to support the various operations of blocks 206-210 of FIG. 2. The user account information module 312 can include identification, authentication and membership details regarding an account or relationship that a user has with an entity, which can facilitate access to that account via communications with the entity. The memory 306 additionally includes a general operations module 319 that can support various functions or tasks as required or desired to serve needs of the telecommunications service provider node 116 or other elements of the system 100. Functions of the modules 312, 314, 316 can be variously combined into a single module or otherwise distributed among different modules. In some embodiments, particularly where the computing device 301 forms a basis for a user's communication device or user equipment such as the user equipment 102, 130, the memory 306 also includes a user interface module 318 to facilitate direct interaction with a human operator. In embodiments where the computing device 301 is a resource within a telecommunications service provider network that provides services to the user, the user interface can be useful for auditing or control purposes.

One or more instances of the router 303 can be variously located within and support routing functions within the telecommunications service provider node 116, particularly with respect to the call routing module 110, and can also be included within and support operations of the communications network 108 and possibly the third party service providers 112, 114. The router 303 includes processors 324, a communication interface 328, hardware 330, and a memory 326 that contains various software modules including a routing management module 334 that supports various routing functions of the router. A router API module 336 can support communications between the router and other entities, for example the computing device 301. Also included are a user interface module 338 to facilitate direct communications with a human operator if needed, and a general operations module 332 that can enable the router 303 to accept and accomplish various tasks for the system or subsystem to which it more particularly belongs to.

The memories 306, 326 may include computer-readable storage media. Computer-readable storage media may include volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media does not consist of, and is not formed exclusively by, modulated data signals, such as a carrier wave.

Various embodiments provide technical advantages that enable greater service and functionality to be provided to users with greater efficiency and lower resource cost. For example, where the smart address book service automatically accesses a user's account with an entity, useful information can be identified and shared more quickly and using less resources than if the user were to open a web browser, navigate to a website of the entity, login and access the account information, at least in part because when the smart address book service automatically accesses the account there is no need to download data to form a visual interface for the user in the web browser. Where the user is accessing the account information from a personal communications device such as a smart phone, this reduction in data flow also conserves both battery power of the device as well as wireless data traffic and reduces corresponding costs as well as providing a faster, more transparent user experience. In addition, automatically updating and flushing or archiving obsolete or incorrect data from the user's contacts database or address book reduces data storage requirements along with corresponding hardware and power consumption. Further economies in terms of wireless bandwidth use and device power consumption are also provided where data are transferred to the smart address book service acting as an automatic agent on behalf of the user, instead of the user requesting and receiving information via a voice call, because the data can be transferred more quickly and more compactly.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network device, comprising:
at least one processor;
a network interface;
a storage device coupled to at least one processor;
software instructions stored in the storage device, wherein execution of the software instructions by the at least one processor configures the network device to perform acts comprising:
receiving input on behalf of a user;
based on the input, searching a contacts database of the user;
identifying context information of the user with respect to the input;
identifying at least one entity and context information of the entity based on at least one of the input, results of the search of the user's contacts database, or the identified context information of the user; and
determining actionable options based on the input, the search results, the identified context of the user and the identified context information of the identified at least one entity, for presentation to the user on a communication device;
wherein:
the input comprises verbal or text input from the user that represents an entity;
identified context information of the user indicates an account held by the user with the represented entity; and
the acts further comprise:
accessing the user's account with the represented entity;
determining, based on context information of the user and information from the user's account with the represented entity, including past locations and times when the user communicated with the represented entity and characteristics of past services provided to the user by the represented entity, service request options for presentation to the user to select and request services with respect to the represented entity; and
providing the determined service request options for presentation to the user.

2. The network device of claim 1, wherein the acts further comprise:
providing the actionable options to the communication device for presentation to the user.

3. The network device of claim 1, wherein the network device is incorporated within the communication device.

4. The network device of claim 1, wherein the input is a communication for the user from a third party to the communication device.

5. The network device of claim 1, wherein the input is provided by the user to the communication device and represents an action or entity.

6. The network device of claim 1, wherein:
the input comprises an incoming telephone call;
the identified context information of the user indicates a prior call between the user and an entity associated with the incoming telephone call, that occurred within a first predetermined time window and lasted longer than a predetermined threshold call duration; and
the acts further comprise:
performing an Internet search to verify that a phone number of the incoming telephone call is validly associated with the same entity as the prior call; and
providing a name of the entity associated with the incoming call and a probable subject of the call for presentation to the user.

7. The network device of claim 6, wherein the identified context information of the user includes an entry in the user's calendar that references the entity associated with the incoming call and also includes one or more emails exchanged between the user and the entity associated with the incoming call; and
wherein the acts further comprise:
updating the user's contacts database in response to the Internet search.

8. The network device of claim 1, wherein:
the input comprises an incoming telephone call;
identified context information of the user indicates an account held by the user with an entity that is associated with the incoming telephone call; and
the acts further comprise:
accessing the user's account with the entity associated with the incoming telephone call and identifying one or more outstanding issues regarding the account; and
providing a name of the entity associated with the incoming call and, based on the identified one or more outstanding issues regarding the user's account with the entity associated with the incoming call, a probable subject of the call, for presentation to the user.

9. The network device of claim 1, wherein the represented entity is a transportation network company and the acts further comprise:
receiving a selection from the user;
relaying the selection to the transportation network company;
receiving confirmation of a selected service to be provided by the transportation network company and details regarding the selected service for display to the user, including at least one of vehicle make, vehicle model, vehicle color, vehicle identification signal, or vehicle contact information; and
in response to further input from the user identifying the represented entity, accessing the user's account with the represented entity to obtain status information regarding the selected service and providing the status information for presentation to the user.

10. The network device of claim 1, wherein:
the input comprises verbal or text input from the user that represents a retail store entity; and
the acts further comprise:
ranking different retail store locations of the retail store entity based on context information of the user including past locations, times and purchases when the user patronized the different retail store locations, and including present location of the user and present time;
providing for display to the user a list of retail store locations of the retail store entity in ranked order together with options to select directions to, and open communications with, at least one of the retail store locations in the list; and
receiving a selection from the user of at least one of the options.

11. A network device, comprising:
at least one processor;
a network interface;
a storage device coupled to at least one processor;
software instructions stored in the storage device, wherein execution of the software instructions by the at least one processor configures the network device to perform acts comprising:
receiving input on behalf of a user;
based on the input, searching a contacts database of the user;
identifying context information of the user with respect to the input;
identifying at least one entity and context information of the entity based on at least one of the input, results of the search of the user's contacts database, or the identified context information of the user; and
determining actionable options based on the input, the search results, the identified context of the user and the identified context information of the identified at least one entity, for presentation to the user on a communication device;
wherein:
the received input includes a battery storage level of a communications device of the user;
context information of the user includes indications that the user and the communications device are at a travel destination location;
context information of the user includes past purchase history information regarding charging equipment for the communications device; and
the acts further comprise:
performing an Internet search to determine purchase options for the user for charging equipment for the communications device, based on at least one of the user's past purchase history information or performance specifications of the communications device; and
providing purchase options for charging equipment for the communications device, for display to the user.

12. The network device of claim 11, wherein the options provided for the user include:
directions to retail locations that have charging equipment for the communications device and are located in an airport or between the airport and a destination in an itinerary of the user; and
options to communicate with one or more vendors to order charging equipment for the communications device for delivery to a location in the user's itinerary.

13. A method for operating a network, comprising:
receiving input on behalf of a user;
based on the input, searching a contacts database of the user;
identifying context information of the user with respect to the input;
identifying at least one entity and context information of the entity based on at least one of the input, results of the search of the user's contacts database, or the identified context information of the user;
determining actionable options based on the input, the search results, the identified context of the user and the identified context information of the identified at least one entity, for presentation to the user on a communication device;
wherein:
the input comprises verbal or text input from the user that represents an entity;
identified context information of the user indicates an account held by the user with the represented entity; and
the method further comprises:
accessing the user's account with the represented entity;
determining, based on context information of the user and information from the user's account with the represented entity, including past locations and times when the user communicated with the represented entity and characteristics of past services provided to the user by the represented entity, service request options for presentation to the user to select and request services with respect to the represented entity; and
providing the determined service request options for presentation to the user.

14. The method of claim 13, wherein:
the input comprises an incoming telephone call;
the identified context information of the user indicates a prior call between the user and an entity associated with the incoming telephone call, that occurred within a first predetermined time window and lasted longer than a predetermined threshold call duration;
the identified context information of the user includes an entry in the user's calendar that references the entity associated with the incoming call and also includes one or more emails exchanged between the user and the entity associated with the incoming call; and
the method further comprises:
performing an Internet search to verify that a phone number of the incoming telephone call is validly associated with the same entity as the prior call; and
providing a name of the entity associated with the incoming call and a probable subject of the call for presentation to the user; and
updating the user's contacts database in response to the Internet search.

15. The method of claim 13, wherein:
the input comprises an incoming telephone call;
identified context information of the user indicates an account held by the user with an entity that is associated with the incoming telephone call; and
the method further comprises:
accessing the user's account with the entity associated with the incoming telephone call and identifying one or more outstanding issues regarding the account; and
providing a name of the entity associated with the incoming call and, based on the identified one or more outstanding issues regarding the user's account with the entity associated with the incoming call, a probable subject of the call, for presentation to the user.

16. One or more computer-readable storage media storing instructions that, when executed by one or more processors, cause the processors to perform acts comprising:
receiving input on behalf of a user;
based on the input, searching a contacts database of the user;
identifying context information of the user with respect to the input;
identifying at least one entity and context information of the entity based on at least one of the input, results of the search of the user's contacts database, or the identified context information of the user;
determining actionable options based on the input, the search results, the identified context of the user and the identified context information of the identified at least one entity, for presentation to the user on a communication device;
wherein:
the input comprises verbal or text input from the user that represents an entity;
identified context information of the user indicates an account held by the user with the represented entity; and
the acts further comprise:
accessing the user's account with the represented entity;
determining, based on context information of the user and information from the user's account with the represented entity, including past locations and times when the user communicated with the represented entity and characteristics of past services provided to the user by the represented entity, service request options for presentation to the user to select and request services with respect to the represented entity; and
providing the determined service request options for presentation to the user.

17. The computer-readable storage media of claim 16, wherein:
the input comprises an incoming telephone call;
the identified context information of the user indicates a prior call between the user and an entity associated with the incoming telephone call, that occurred within a first predetermined time window and lasted longer than a predetermined threshold call duration; and
the acts further comprise:
performing an Internet search to verify that a phone number of the incoming telephone call is validly associated with the same entity as the prior call; and
providing a name of the entity associated with the incoming call and a probable subject of the call for presentation to the user.

18. The computer-readable storage media of claim 16, wherein:
the input comprises verbal or text input from the user that represents a retail store entity; and
the acts further comprise:
ranking different retail store locations of the retail store entity based on context information of the user including past locations, times and purchases when the user patronized the different retail store locations, and including present location of the user and present time;
providing for display to the user a list of retail store locations of the retail store entity in ranked order together with options to select directions to, and open communications with, at least one of the retail store locations in the list; and
receiving a selection from the user of at least one of the options.

19. The computer-readable storage media of claim 16, wherein the represented entity is a transportation network company and the acts further comprise:
receiving a selection from the user;
relaying the selection to the transportation network company;
receiving confirmation of a selected service to be provided by the transportation network company and details regarding the selected service for display to the user, including at least one of vehicle make, vehicle model, vehicle color, vehicle identification signal, or vehicle contact information; and in response to further input from the user identifying the represented entity, accessing the user's account with the represented entity to obtain status information regarding the selected service and providing the status information for presentation to the user.

20. The method of claim 13, wherein the represented entity is a transportation network company and the method further comprises:

receiving a selection from the user;

relaying the selection to the transportation network company;

receiving confirmation of a selected service to be provided by the transportation network company and details regarding the selected service for display to the user, including at least one of vehicle make, vehicle model, vehicle color, vehicle identification signal, or vehicle contact information; and in response to further input from the user identifying the represented entity, accessing the user's account with the represented entity to obtain status information regarding the selected service and providing the status information for presentation to the user.

* * * * *